Patented Feb. 16, 1932

1,845,059

UNITED STATES PATENT OFFICE

THEODOR SABALITSCHKA, OF BERLIN-STEGLITZ, GERMANY

DISINFECTANT

No Drawing. Application filed June 17, 1927, Serial No. 199,631, and in Germany June 18, 1926.

The present invention concerns a process for the conserving of foods, provisions, technical and pharmaceutical preparations and for the manufacture of disinfecting preparations, consisting in incorporating acetanisidine with the conserving substances or the bases for the disinfecting preparations.

Partially etherified polyvalent phenols, as for example, guaiacol find application as antiseptics, the antiseptic action being ascribed to the free phenol groups still contained therein.

In the literature the view is expressed that the substitution of the phenolic hydroxyls by etherification causes the characteristic corrosive and antiseptic properties of the phenols to become lost (see Fränkel, die Arzneimittel-Synthese, Berlin 1921, page 548).

In accordance with this invention this view is by no means always justified, but conversely the action of acetoaminophenol in regard to restricting development of microorganisms can actually be increased by etherification. Thus by the combination of the phenol group with alkyl the corrosive action inherent in the phenol is indeed removed without thereby reducing the action of preventing such development and in fact it can on the contrary be even increased. This can be seen from the following figures giving molecular concentrations per litre, by which the development of microorganisms in a neutral culture could be still prevented.

Acetoaminophenol_____ 0.015
Acetanisidine_____ 0.004

Acetanisidine is therefore suitable for the conserving of provisions, technical and pharmaceutical preparations and the like, as also for the manufacture of disinfectants. The phenol ether in contradistinction to the phenol offer the advantage that it does not exhibit the corrosive action of the free phenol and also that it does not react with albuminous substances with the formation of precipitates or colourations. Accordingly the efficiency of the ether in conserving or disinfecting in the presence of albuminous substances does not undergo any reduction as a consequence of the fact that it does not react with albuminous substances in contradistinction to the free phenol. In addition the ether is also insensitive with respect to the substances into which it is to be incorporated, while the specific performance of the phenol is destroyed by alkaline reaction, for example.

The following example illustrates the invention:

For the manufacture of a disinfecting foot dusting powder 3 grams of acetanisidine of the following formula:

$$CH_3.O.C_6H_4.NH.CO.CH_3,$$

20 grams of zinc oxide, 27 grams of wheat starch and 50 grams of talc are mixed to complete homogenetity.

I claim:

A disinfecting and preservative agent containing as an active constituent acetanisidine.

In testimony whereof I have hereunto set my hand.

THEODOR SABALITSCHKA.